US009630276B2

(12) United States Patent
Hsieh

(10) Patent No.: US 9,630,276 B2
(45) Date of Patent: Apr. 25, 2017

(54) SPRING COMPENSATION STRUCTURE FOR A TORQUE WRENCH

(71) Applicant: KABO TOOL COMPANY, Taichung (TW)

(72) Inventor: Chih-Ching Hsieh, Taichung (TW)

(73) Assignee: KABO TOOL COMPANY, Taichung (TW)

( * ) Notice: Subject to any disclaimer, the term of this patent is extended or adjusted under 35 U.S.C. 154(b) by 0 days.

(21) Appl. No.: 15/191,505

(22) Filed: Jun. 23, 2016

(65) Prior Publication Data

US 2016/0303692 A1    Oct. 20, 2016

Related U.S. Application Data

(62) Division of application No. 14/018,445, filed on Sep. 5, 2013, now Pat. No. 9,415,471.

(30) Foreign Application Priority Data

Sep. 10, 2012    (TW) .............................. 101133014 A

(51) Int. Cl.
| F16F 1/12 | (2006.01) |
| B23P 6/00 | (2006.01) |
| F16F 1/32 | (2006.01) |
| B25B 23/142 | (2006.01) |

(52) U.S. Cl.
CPC ............ *B23P 6/00* (2013.01); *B25B 23/1427* (2013.01); *F16F 1/121* (2013.01); *F16F 1/324* (2013.01); *Y10T 29/4973* (2015.01)

(58) Field of Classification Search
CPC .. Y10T 29/4973; Y10T 29/49732; B23P 6/00; B25B 23/1427; F16F 1/324
See application file for complete search history.

(56) References Cited

U.S. PATENT DOCUMENTS 1,551,758 A     9/1925  Lehr
4,535,659 A *   8/1985  Yang ................... B25B 23/1427
                                                              81/476

\* cited by examiner

*Primary Examiner* — Sarang Afzali
*Assistant Examiner* — Ruth G Hidalgo-Hernandez
(74) *Attorney, Agent, or Firm* — CKC & Partners Co., Ltd.

(57) ABSTRACT

A spring compensation structure for a torque wrench includes a body, a compensation component and an engaging head. The body has a first connecting portion, The compensation component is installed on the body and has a compensation distance, wherein one end of the compensation component is abutted on the first connecting portion of the body. The engaging head has a second connecting portion; the second connecting portion is detachably disposed on the body and is abutted on the other end of the compensation component, wherein a distance between the second connecting portion and the first connecting portion is equal to the compensation distance.

5 Claims, 4 Drawing Sheets

```
┌─────────────────────────────────────────┐
│      the engaging head is removed for   │──── 410
│   departing the second connecting portion│
│       and the compensation component    │
└─────────────────────────────────────────┘
                    ⇩
┌─────────────────────────────────────────┐
│     the used compensation component is  │──── 420
│    replaced to a new compensation component│
│       with a proper compensation distance│
└─────────────────────────────────────────┘
                    ⇩
┌─────────────────────────────────────────┐
│   the new compensation component is installed to the│──── 430
│     body, and one end of the new compensation│
│   component is abutted on the first connecting portion│
└─────────────────────────────────────────┘
                    ⇩
┌─────────────────────────────────────────┐
│    the second connecting portion is abutted on the first│
│      connecting portion of the body, and another end│
│    of the new compensation component is abutted on the│──── 440
│  second connecting portion, and a determined compensation│
│       distance is formed between the first connecting│
│   portion of the body and the second connecting portion│
└─────────────────────────────────────────┘
```

Fig. 5

SPRING COMPENSATION STRUCTURE FOR A TORQUE WRENCH

RELATED APPLICATIONS

The present application is a Divisional Application of the U.S. application Ser. No. 14/018,445, filed Sep. 5, 2013, which claims priority to Taiwan Application Serial Number 101133014 filed Sep. 10, 2012, all of which are herein incorporated by reference.

BACKGROUND

Technical Field

The present disclosure relates to a compensation structure for a torque wrench, more particularly relates to a spring compensation structure for a torque wrench.

Description of Related Art

Mechanical parts are becoming more delicate and complicated with the advance of mechanical manufacturing technology. The knowledge on mechanical assembling is also continuingly raising for the people. Not only a machine factory, demand on applying a precise torque to a component is increased for the people who repair by themselves household goods, leisure equipment or vehicles. As such, requirements on the precision of a tongue wrench are increasingly high.

The torque wrench is a precision hand tool that can obtain a required torque while engaging with a component. Conventional torque wrench utilizes a spring as a torque sensor; when a torque of the torque wrench reaches a specified value, a deformation of the spring reaches to a specified value simultaneously. Some of the conventional torque wrenches utilize a trip mechanism for tripping to make a warning sound, and the other ones utilize a display or an indicator to show the torque value or a warning signal when the spring is force taken and deformed.

FIG. 1 is a structural diagram showing a structure of a conventional torque wrench. The torque wrench includes a body 100 and an engaging head 500. The engaging head 500 is located at one end of the body 100 for connecting and applying a torque to a workpiece. The body 100 includes a spring 101 located inside and connected with the engaging head 500. A handle portion 102 is located at outside of the body 100 for gripping with a user. A sensor 103 is connected with the spring 101 for sensing and converting the force taken on the spring 101 to a torque value, and the torque value is displayed on a display panel (not shown).

When the elasticity of the spring is gradually decreased after the use for a period of time, using frequency or using strength, the accuracy of the torque wrench is decreased accordingly. Therefore, the torque value is no longer accurate, and the torque wrench is no longer being useful.

For saving the cost of replacing a new torque wrench, a new kind torque wrench with a calibratable torque value has been developed. When the spring of a torque wrench losses elasticity but other components of the torque wrench work, one conventional method is provided to open the torque wrench and replace the used spring to a new one in order to recover the accuracy of the torque wrench. Another conventional method is provided to add an extra gasket incorporated with the spring for increasing a pre-compression of the spring in order to compensate the elastic fatigue. Some other conventional method is to open the torque wrench and adjust the position of the spring in order to increase the pre-compression of the spring thereby to compensate the elastic fatigue.

However, the conventional methods described above suffer from a shortcoming that opening the torque wrench is required to conduct an adjustment. Therefore, the methods are very complicated in process steps and may have great influences on the original setting of the components of the torque wrench, thereby leading more difficulty on assembly and calibration of the components. Moreover, since the conventional spring compensation structure has to be maintained directly from the inner structure of the torque wrench, the components involved complicated and the operation in the maintenance is highly precisely. As a result, the manufacturing process is difficult and the cost of the torque wrench keeps high.

SUMMARY

According to one aspect of the disclosure, a spring compensation structure for a torque wrench is provided. The spring compensation structure includes a body, a compensation component and an engaging head. The body has a first connecting portion. The compensation component is installed on the body and has a compensation distance, wherein one end of the compensation component is abutted on the first connecting portion of the body. The engaging head has a second connecting portion; the second connecting portion is detachably disposed on the body and is abutted on the other end of the compensation component, wherein a distance between the second connecting portion and the first connecting portion is equal to the compensation distance.

According to another aspect of the disclosure, a spring compensation structure for a torque wrench is provided. The spring compensation structure includes a body and an engaging head. The body has a first connecting portion. The engaging head has a second connecting portion, the second connecting portion is detachably disposed on the body, and a position of the second connecting portion on the body is adjustable for making a distance between the second connecting portion and the first connecting portion being equal to a compensation distance.

BRIEF DESCRIPTION OF THE DRAWINGS

The present disclosure can be more fully understood by reading the following detailed description of the embodiment, with reference made to the accompanying drawings as follows:

FIG. 5 is a flow chart showing a spring compensating method applied to the spring compensation structure of the present disclosure.

DETAILED DESCRIPTION

Figure 1:
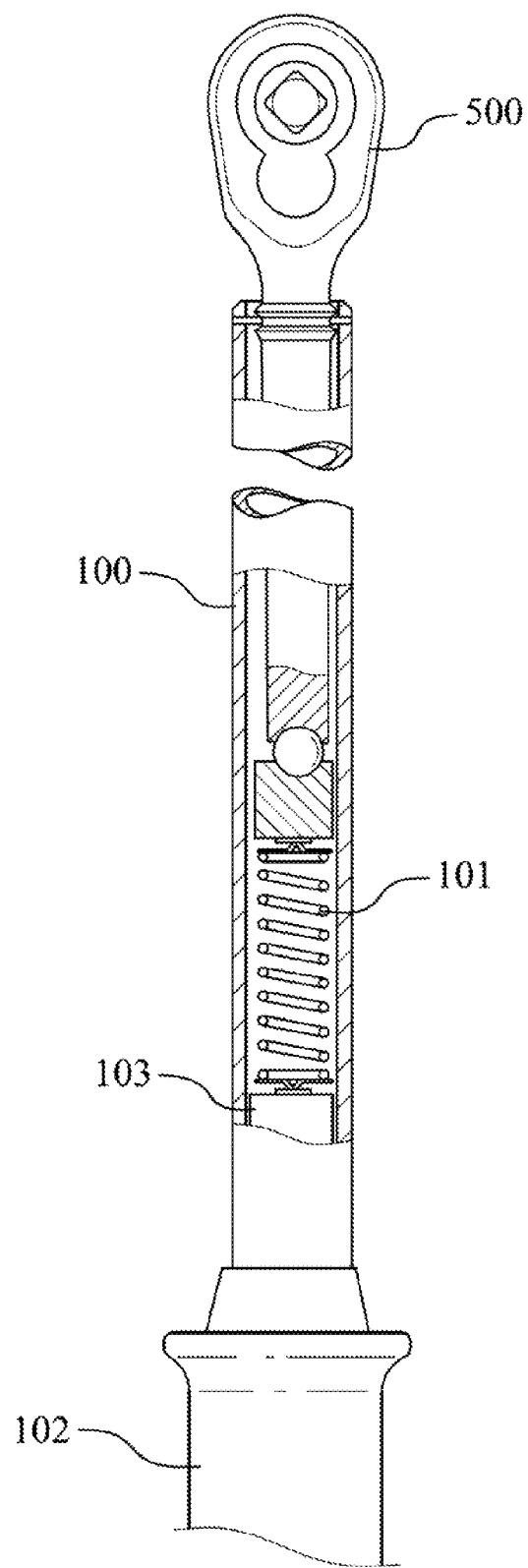
FIG. 1 is a structural diagram showing a structure of a conventional torque wrench.
Figure 2:
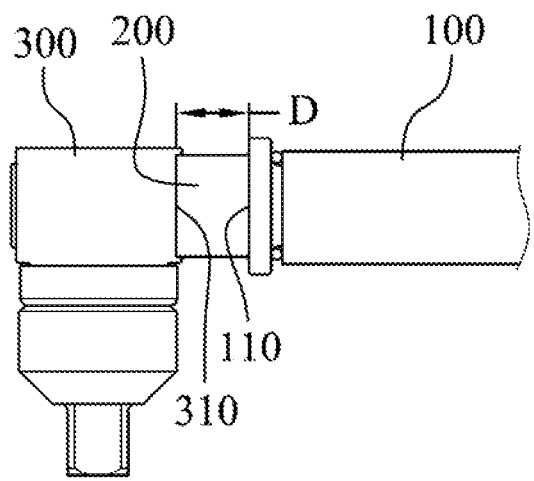
FIG. 2 is a structure diagram showing a spring compensation structure according to one embodiment of the present disclosure.
Figure 3:
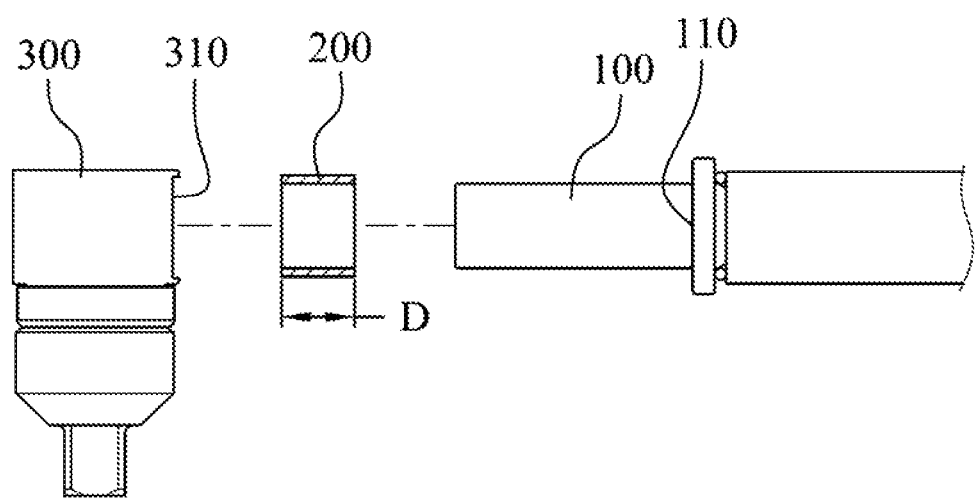
FIG. 3 is a breakdown drawing of the components of FIG. 2.

FIG. 2 is a structure diagram showing a spring compensation structure according to one embodiment of the present disclosure. FIG. 3 is a breakdown drawing of the components of FIG. 2. The spring compensation structure includes a body 100, a compensation component 200 and an engaging head 300. The body 100 includes a first connecting portion 110. The body 100 is jacketed by the compensation component 200 which has a compensation distance D. One end of the compensation component 200 is abutted on the first connecting portion 110. The engaging head 300 has a second connecting portion 310 being detachably disposed on the body 100, and the second connecting portion 310 is abutted on the other end of the compensation component 200. Therefore, a distance between the second connecting portion 310 and the first connection portion 110 is equal to the compensation distance D.

The second connecting portion 310 can be disposed to the body 100 by screwing, embedding or stressing. Conventionally, there exist many methods for disposing the second connecting portion 310 to the body 100, there is no more repeating. When the second connecting portion 310 is connected and fixed to the body 100, the compensation component 200 is abutted on the second connecting portion 310, and the first connecting portion 110 is abutted on the compensation component 200.

Figure 4A:
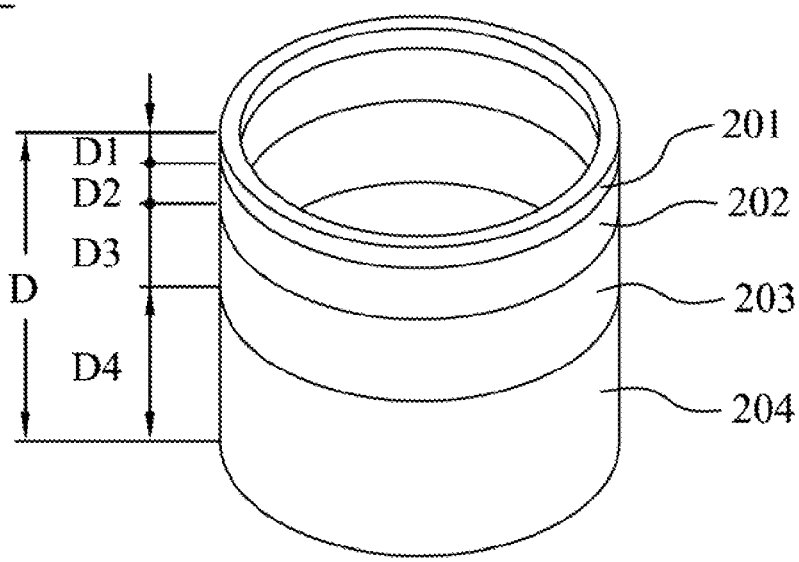
FIG. 4A is a structural diagram showing an example of the spring compensation structure of the present disclosure.
Figure 4B:
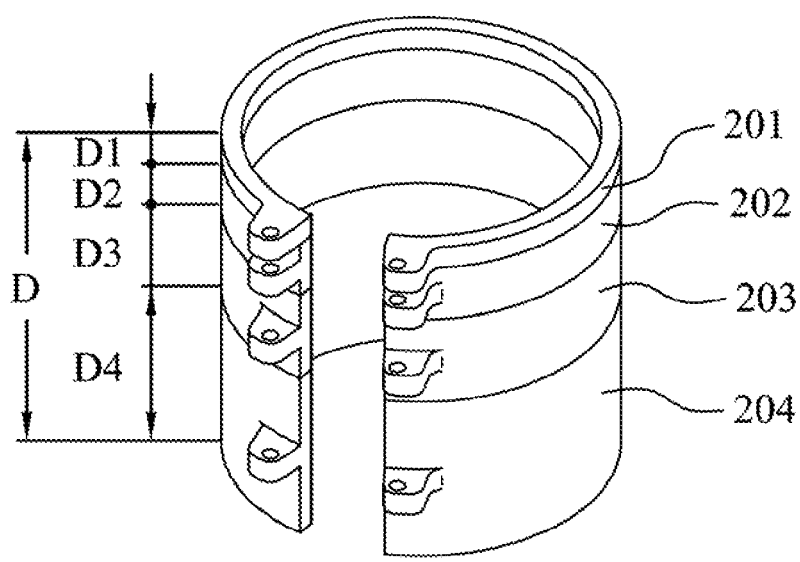
FIG. 4B is a structural diagram showing another example of the spring compensation structure of the present disclosure.

FIG. 4A and FIG. 4B are structural diagrams showing two examples of the spring compensation structure of the present disclosure. In FIG. 4A, a section of the compensation component 200 is ring-shaped. The compensation component 200 is formed by stacking a plurality of compensation units (201~204), each of the compensation units (201~204) has a compensation unit distance (D1~D4), where a sum of the compensation unit distances (D1~D4) is the compensation distance D of the compensation component 200. The quantity of the compensation units (201~204) is not limited. For example, 2, 3, 4, 5, 7 or 9 compensation units can be used The compensation unit distance D1~D4 can be the same or different from each other.

Referring to FIG. 4B, the difference between FIG. 4A and FIG. 4B is, the section of the compensation component 200 and the compensation units (201~204) is C-shaped. When each of the compensation units (201~204) is assembled or taken off, a blot can be used for connecting the engaging head 300 and the body 100, and it is unnecessary to totally depart the engaging head 300 and the body 100. Therefore, it is easier to remove and replace compensation units (201~204).

FIG. 5 is a flow chart showing a spring compensating method applied to the spring compensation structure of the present disclosure. In step 410 the engaging head is removed for departing the second connecting portion and the compensation component; in step 420, the used compensation component is replaced to a new compensation component with a proper compensation distance; in step 430, the new compensation component is installed to the body, and one end of the new compensation component is abutted on the first connecting portion; in step 440, the second connecting portion is abutted on the first connecting portion of the body, and another end of the new compensation component is abutted on the second connecting portion, and a determined compensation distance is formed between the first connecting portion of the body and the second connecting portion.

When a torque value of the torque wrench is not accurate, the spring compensating method can be applied, for example, the elastic force of the spring will be fatigued with the increasing using period, thus leading the inaccurate of the torque. At the time, according to FIG. 2 and FIG. 3, the used compensation component 200 can be replaced with a new compensation component 200 with a smaller compensation distance D to reduce the compensation distance D between the engaging head 300 and the body 100.

Another method to reduce the compensation distance D is disclosed in FIG. 4A and FIG. 4B. In FIG. 4A and 4B, each of the compensation units (201~204) can be taken off or be replaced to a new one with a smaller compensation unit distance, where the sum of the compensation unit distances (201~204) is the compensation distance D, thus the compensation distance D is reduced. When the body 100 applies the same engaging force to the engaging head 300, the reduced compensation distance D leads to a reduction of a stimulated lever arm, this the torque is reduced. A compensation effect will occur due to the smaller torque applied to the spring with fatigued elastic force, and an accurate torque value can be obtained.

The spring compensating method is not limited to be applied on the situation of elastic fatigue of the spring or the reduction of the compensation distance D, but also can be applied on the calibration of the torque value when a torque wrench is manufactured. When the torque value of a new made torque wrench is inaccurate, the spring compensating method can be applied to increase or reduce the compensation distance D, therefore a higher or a lower torque value can be compensated to a proper value.

In sum up, the present disclosure has advantages as follows.

According to the aforementioned embodiments, the advantages of the present disclosure are described as follows.

a. The compensation component can be easily replaced for calibrating, the torque value of the torque wrench.

b. It is unnecessary to open the inner structure of the torque wrench; therefore the accuracy of the inter structure of the torque wrench can be maintained.

c. The spring compensation structure simple, thereby reducing the manufacturing cost of the torque wrench.

d. The spring compensating method is easily to be performed, thereby reducing the cost of the maintenance and re pair of the torque wrench.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A spring compensation structure for a torque wrench, the spring compensation structure comprising:
  a body having a first connecting portion;
  a compensation component installed on the body and having a compensation distance, wherein one end of the compensation component is abutted on the first connecting portion of the body; and
  an engaging head having a second connecting portion, the second connecting portion being detachably disposed on the body and being abutted on an other end of the compensation component, wherein a distance between the second connecting portion and the first connecting portion is equal to the compensation distance;
  wherein the compensation component is adjustably formed by stacking a plurality of different compensation units, each of the compensation units having a compensation unit distance, a sum of the compensation unit distances is equal to the compensation distance, and the compensation distance is adjustable through replacing the compensation units to new compensation units having new compensation unit distances;

wherein a torque loss caused by elastic fatigue of a spring of the torque wrench is compensated by adjusting the compensation distance.

2. The spring compensation structure of claim 1, wherein a section of the compensation component is ring-shaped.

3. The spring compensation structure of claim 1, wherein a section of the compensation component is C-shaped.

4. The spring compensation structure of claim 1, wherein the second connecting portion is detachably disposed on the body by screwing, embedding or stressing.

5. The spring compensation structure of claim 1, wherein the compensation unit distance is 0.1, 1, 2, 5, or 10 mm.

* * * * *